Patented Mar. 29, 1949

2,465,339

UNITED STATES PATENT OFFICE 2,465,339

METHOD FOR PREPARING FLUORINE-SUBSTITUTED ORTHOSILICIC ACID ESTERS

Richard S. Schreiber, Brandywine Hundred, Del., assignor to E. I. du Pont de Nemours & Company, Wilmington, Del., a corporation of Delaware No Drawing. Application August 15, 1944,
Serial No. 549,631

4 Claims. (Cl. 260—448.8)

This invention relates to organic compounds of silicon.

This invention has as an object the production of new and useful compositions of matter. A further object is the preparation of organic compounds from chlorofluorosilicanes. Other objects will be apparent from the following description of the invention.

These objects are accomplished by the following invention which comprises reacting a chlorofluorosilicane with a compound of the formula $R(XZ)_y$ wherein R is a hydrocarbon radical or a hydrocarbon radical interrupted by a heteroatom, X is a chalcogen atom of atomic weight less than 33, Z is a hydrogen or an alkali metal atom and $y$ is a positive integer corresponding to the valence of R.

The products of this invention are esters of fluorine substituted orthosilicic acids and may be represented by the following empirical formula $[(SiF_n)_y(X_yR)_{4-n}]$ wherein $n$ is a positive integer within the range of from 1 to 3, X is a chalcogen atom of atomic weight less than 33, R is a hydrocarbon radical or a hydrocarbon radical interrupted by a heteroatom and $y$ is a positive integer corresponding to the valence of R.

The products of this invention may be either monomeric or polymeric depending upon the nature of the reactants used. Thus, when monohydric alcohols or monothiols are reacted with chlorotrifluorosilicane, dichlorodifluorosilicane or trichlorofluorosilicane, monomeric products are obtained. Similarly, when chlorotrifluorosilicane is reacted with a monohydric alcohol, a polyhydric alcohol, a monothiol or a polythiol, a monomeric product is generally obtained. However, when dichlorodifluorosilicane or trichlorofluorosilicane is reacted with a polyhydric alcohol, or a polythiol, polymeric products are generally obtained.

If a compound containing two XZ groups is reacted with trichlorofluorosilicane or if a compound containing three or more XZ groups is reacted with dichlorodifluorosilicane or trichlorofluorosilicane, the polyester will generally be three dimensional. Whether a linear or cyclic (two-dimensional) or three-dimensional polyester is obtained will depend upon the extent of the reaction; on prolonged reaction a three-dimensional polymer will result. When dicholordifluorosilicane is reacted with a compound containing two XZ groups, two-dimensional polymers are generally obtained. The products are all characterized by having the fluorine atoms directly attached to the silicon atom, and the silicon atom, in turn, attached to carbon through a chalcogen of atomic weight less than 33.

The following examples, wherein parts are given by weight, are given for illustrative purposes and are not intended to place any restrictions on the herein described invention.

Example I

A solution of 30 parts of dichlorodifluorosilicane and 35 parts of anhydrous ether is placed in a glass reactor fitted with a dropping funnel, an outlet tube and stirrer. The reactor is cooled to about —78° C. with a mixture of solid carbon dioxide and acetone, and 37.8 parts of n-butanol dissolved in 35 parts of anhydrous ether is added slowly. During these operations, precautions are taken to exclude moisture from the reactor. When the addition of the alcohol solution is complete, the ether is removed by distillation at atmospheric pressure and the residual product is then distilled under reduced pressure in a slow stream of nitrogen. There are obtained 17.5 parts of dibutoxydifluorosilicane boiling at 57–58° C./13 mm. and 16.5 parts of tributoxyfluorosilicane boiling at 113.5–114.5° C./13 mm. Analysis: Calculated for $C_8H_{18}F_2O_2Si$: C, 45.5; H, 8.5; F, 17.9; Si, 13.2. Found: C, 44.3; H, 8.8; F, 17.5; Si, 12.6. Analysis: Calculated for $C_{12}H_{27}FO_3Si$: C, 54.2; H, 10.1; F, 7.1; Si, 10.5. Found: C, 54.6; H, 10.7; F, 6.5; Si, 10.4.

Example II

In a manner similar to that described in the preceding example, a solution of 9.5 parts of ethylene glycol in 40 parts of the dimethyl ether of ethylene glycol is added to 21 parts of dichlorodifluorosilicane dissolved in 20 parts of the same solvent. After the addition is complete, the solvent is removed by distillation. A clear, glassy, polymeric product remains. Analysis: Calculated for $[C_2H_4F_2O_2Si]$: C, 19.0; H, 3.2; Si, 22.2. Found: C, 23.5; H, 5.6; Si, 17.9.

Example III

A solution of 36 parts of dichlorodifluorosilicane and 150 parts of anhydrous ether is placed in a glass reactor fitted with a stirrer and an outlet tube. The solution is cooled with a mixture of solid carbon dioxide and acetone and 40 parts of sodium ethyl mercaptide is added slowly while stirring. During these operations, precautions are taken to exclude moisture from the reactor. After the addition of the mercaptide is complete, the mixture is allowed to warm to room temperature and the solution is filtered to remove the precipitated sodium chloride. Upon distillation of the filtrate there are obtained 24 parts of diethylthiodifluorosilicane boiling at 163–164° C. and 6 parts of triethylthiofluorosilicane boiling at 114–115° C./10 mm. Analysis: Calculated for $C_4H_{10}F_2S_2Si$: C, 25.5; H, 5.3; F, 20.2; S, 34.0; Si, 14.9. Found: C, 27.3; H, 5.6; F, 21.5; S, 32.3; Si, 15.7. Analysis: Calculated for $C_6H_{15}FS_3Si$: F, 8.3; S, 41.7; Si, 12.3. Found: F. 10.8; S, 40.3; Si, 12.5.

*Example IV*

In a manner similar to that described in Example III, 32.2 parts of 1,6-disodium hexamethylene dimercaptide is added slowly to a solution of 23 parts of dichlorodifluorosilicane in 180 parts of dry ether. After removal of the sodium chloride and ether, a yellow oily polymer is obtained. Analysis: Calculated for $[C_6H_{12}F_2S_2Si]$: C, 33.6; H, 5.6; Si, 13.1. Found C, 33.3; H, 5.7; Si, 13.0

Although the invention is illustrated by the reaction of dichlorodifluorosilicane with butanol, ethylene glycol, ethyl mercaptan and hexamethylene dithiol, it is applicable to chlorofluorosilicanes and organic compounds containing hydroxyl and thiol groups in general. Other chlorofluorosilicanes which are operative in this invention include chlorotrifluorosilicane and trichlorofluorosilicane. Examples of other alcohols are methanol, ethanol, isopropanol, dodecanol, and hexadecanol; cycloaliphatic alcohols, such as cyclohexanol; aromatic compounds, such as phenol, the cresols, resorcinol, the naphthols, and benzyl alcohol; polyhydric alcohols such as glycerol, sorbitol, hexamethylene glycol, diethylene glycol and decamethylene glycol, and polymeric alcohols, such as polyvinyl alcohol. Examples of other thiols are butyl mercaptan, octyl mercaptan, lauryl mercaptan, thiophenol, thiocresol, thionaphthol and ethane dithiol. Compounds containing hydroxyl and thiol groups, such as thioglycerol and 1-thiosorbitol, are also operative in the process of this invention.

As indicated in Examples III and IV it is generally necessary to employ the alkali metal mercaptides in order to obtain appreciable yields of the thio esters of the fluorine-substituted orthosilicic acids. In general, it is undesirable to use amounts of the mercaptide in excess of that required to react with the chlorine atoms present in the chlorofluorosilicane employed. When an alcohol is reacted with the chlorofluorosilicane, it is unnecessary to employ the alkali metal alcoholate in order to obtain the esters of the fluorine-substituted ortho-silicic acids. If desired, the alcoholate may be employed if precaution is taken to avoid the use of amounts of the alcoholate in excess of that required to react with the chlorine atoms present in the chlorofluorosilicane.

The process of this invention can be effected in the presence or absence of a solvent. Solvents which can be used as the reaction medium for the preparation of the novel products of this invention include diethyl ether, dibutyl ether, dimethyl ether of ethylene glycol, dioxane, aliphatic and aromatic hydrocarbons such as isooctane, cyclohexane and toluene.

The temperature of the reaction is generally carried out within the range of −80° C. to room temperature, e. g., 25° C., although higher temperatures can be used. The reaction can be carried out at subatmospheric, atmospheric and superatmospheric pressure.

The products of this invention are useful for various commercial purposes. They may be used in coating compositions, as plasticizers for polymeric materials and as intermediates for the preparation of a large number of silicon compounds.

As many apparently different embodiments of this invention may be made without departing from the spirit and scope thereof, it is to be understood that I do not limit myself to the specific embodiments thereof except as defined in the appended claims.

Having described the present invention, the following is claimed as new and useful:

1. The process for obtaining an ester of a fluorine-substituted orthosilicic acid which comprises reacting a chlorofluorosilicane with a compound selected from the group consisting of saturated alcohols, saturated alkali metal alcoholates and saturated alkali metal mercaptides.

2. The process for obtaining a monomeric alkoxy ester of a fluorine-substituted orthosilicic acid which comprises reacting a chlorofluorosilicane with a saturated monohydric alcohol.

3. The process for obtaining a monomeric alkoxy ester of a fluorine-substituted orthosilicic acid which comprises reacting dichlorodifluorosilicane with an acyclic saturated monohydric alcohol.

4. The process according to claim 3 wherein the alcohol is n-butanol.

RICHARD S. SCHREIBER.

REFERENCES CITED

The following references are of record in the file of this patent:

UNITED STATES PATENTS

| Number | Name | Date |
|---|---|---|
| 2,053,474 | Graves | Sept. 8, 1936 |
| 2,114,866 | Vaughn | Apr. 19, 1938 |
| 2,242,400 | Loane | May 20, 1941 |
| 2,394,642 | Strain | Feb. 12, 1946 |

FOREIGN PATENTS

| Number | Country | Date |
|---|---|---|
| 625,077 | Germany | May 24, 1938 |

OTHER REFERENCES

Post, "Jour. Org. Chem.," vol. 7, pages 528–533 (1942).

Thompson & Kipping, "Chem. Abstracts," vol. 23, page 4457 (1929).

Backer, "Chem. Abstracts," vol. 29, page 2507 (1935).

Volnov, "Chem. Abstracts," vol. 34, pages 5048, 5049, 7874 (1940).

Backer et al., Rec. Trav. Chim., vol. 54 (1935), pages 607–17.

Backer et al., Rec. Trav. Chim., vol. 51 (1932), page 1197.

J. Amer. Chem. Soc., vol. 58 (1936), pages 786–7, Gierut et al.

J. Amer. Chem. Soc., vol. 61 (1939), page 2555 and −6, Tarbutton et al.

Klippert, Ber. Deut. Chem. 8, 713 (1875).